Czesław Stachowiak
Jerzy Grębowski
Karol Natkański
Oskar Weinberger
Władysław Zembaty
INVENTOR.

United States Patent Office 3,493,219
Patented Feb. 3, 1970

3,493,219
TRICKLE UNIT FOR COOLING WATER
Czeslaw Stachowiak, Ul. Zrodlowa 39 m. 7; Jerzy Grebowski, Ul. Glowna 30 m. 8; and Karol Natkanski, Ul. Bydgaska 46 m. 4, all of Lodz, Poland; Oskar Weinberger, Ul. Chelmska 50 m. 45, Warsaw, Poland; and Wladyslaw Zembaty, Ul. Dabrowskiego 25/7, Gliwice, Poland
Continuation-in-part of application Ser. No. 729,820, May 16, 1968. This application Jan. 7, 1969, Ser. No. 789,463
Int. Cl. F28c 1/00
U.S. Cl. 261—103         7 Claims

ABSTRACT OF THE DISCLOSURE

A trickle-type water-cooling unit comprising a tubular cubic frame having a multiplicity of parallel trickle stages of sheets formed of a knitted fabric in a ladder-like unit of hydrophobic synthetic fibers. Air is blown through the array to cool the water film along the fabric.

---

This application is a continuation-in-part of our now abandoned copending application Ser. No. 729,820, filed May 16, 1968 as a continuation-in-part of our then pending application Ser. No. 595,323 of Nov. 16, 1966, now abandoned.

In the aforementioned copending applications, we have generally described a trickle unit forming part of a cooling tower of a forced-air cooler for dissipating the heat of industrial waste water. That device was constructed from a knitted fabirc forming openwork plates of chemical (synthetic-resin) fiber filling the interior of the unit.

In these applications, we have pointed out that conventional refrigeration plants were theretofore provided with trickling units made of corrugated or flat asbestos-cement sheets or of timber plates made of boards and slats. The operating principle of such cooling towers involves the dissipation of heat from the water into atmospheric air by means of evaporation and convection. The warm waste water is distributed over the cross-section of the cooler by means of a system of pipes or troughs. The water flows through a set of sieves and spraying disks, or nozzles, which subdivide the water stream into drops. These drops fall onto the trickling unit wherein the water passes along in the form of a thin film over separate plates or stages of the trickling unit so that the warm water may contact, over a large surface area, atmospheric air flowing upwardly. The water transfers heat to the air, thereby increasing its temperature and humidity. The water cooled in the spray unit drops to a vessel beneath the cooler and is conducted therefrom to the reservoir of the water-circulation pump.

Since the efficiency of such a unit depends upon the number of stages of plates and this number depends, for a given volume of cooler, upon the thickness of the plates and the effective surface area thereof, asbestos-cement and timber structures almost invariably must be larger than is desirable to effect a high degree of heat transfer.

Wood is also inconvenient because of its tendency to decay in the air and moisture environment, and as a consequence of the formation of microflora thereon. Asbestos-cement sheets are disadvantageous because of their poor acid resistance (i.e. at pH less than 6) as well as their poor resistance in basic environments (i.e. pH greater than 8), both these conditions being common in many industrial applications. The assembly and handling of such plates requires extreme care because of their brittleness.

It is, therefore, the principal object of the present invention to extend the concepts laid down in our earlier applications identified above and to provide a highly compact, high-efficiency trickle unit for the mass transfer of heat between water and air which avoids the disadvantages of prior-art systems.

As noted in the earlier applications, we are able to attain this object by providing a spray cooler which consists essentially of light thin openwork sheets of knitted fabric, instead of the massive and heavy plates of wood or asbestos cement. These openwork knitted-fabric sheets make it possible to obtain a much greater effective trickling surface area in relation to the number of plates and their volume. Thus, for example, a trickle unit made of knitted fabric with a volume of 1 m.$^3$ has a trickling surface area of 50 m.$^2$ whereas a conventional trickling unit of timber has a surface area of only 32 m.$^2$.

The system of the earlier applications and of the present invention makes use of a knitted fabric with a ladder structure, to constitute the trickling plates and intensify the turbulent flow of water over the plates and improve the heat-exchange conditions. Making the knitted fabric from a yarn of synthetic fiber makes it possible to decrease the thickness of the plate from 5 to 10 mm. in prior-art systems to 0.5 to 2 mm. with the system of the present invention. Thus, the uniform cross-section of the spray cooler is increased while the air-flow resistance is decreased.

Making trickling plates of knitted fabric also renders it possible to use materials resistant to water and air as well as acidic or basic water. It also precludes any damage in handling, assembling and operation. The weight of a trickling unit, according to this invention, with a volume of 1 m.$^3$, is about 25 kg. whereas wood units of similar volume weigh 150 kg., while asbestos-cement plates form a unit which, in the same volume, would weigh 400 kg. The present system thus permits one to reduce the cross-sectional dimensions of the supporting structure and to replace any existing spray coolers with spray coolers in accordance with the present invention.

The knitted fabric of the system of the invention may span a cubic frame with tubular supporting elements constituting the members around which the continuous fabric is wound.

According to a more specific feature of this invention, the trickle unit comprises a three-dimensional prismatic frame having a pair of coplanar arrays of horizontally spaced vertical tubes composed of a synthetic resin (e.g. rigid polyvinyl chloride), spaced apart across the trickle unit with the tubes of the arrays being spanned by vertical sheets of the fabric.

Preferably, a single sheet is wound alternately about a respective pipe of each array in zigzag fashion. The fabric of the present invention is a so-called warp knit, having a multiplicity of continuous knitted ribs formed by the loop wales, separately connected by weft threads, and the loop wales are effective to mix the water film and promote turbulence therein, thereby increasing the efficiency of the unit. Weft threads are inlaid in the knit to link the wales of the loops.

The fabric is knitted not of a bibulous material but, rather, of hydrophobic synthetic resin filament (e.g. nylon), while the water is sprayed from above onto the array, and the air stream is directed upwardly so as to pass between the vertically oriented sheets or plates.

The arrays of fabric-carrying tubes can be mounted in a frame structure of plastic tubing as will be apparent hereinafter. Because of the construction of the fabric, with its spaced-apart ribs linked by weft threads, the assembly has the configuration of a ladder which requires the water not merely to flow downwardly but to pass from side to side along the weft threads and across the loop wales and thus over the bead-like ribs; the latter function as retarders to the water flow and promote the heat exchange.

The above and other objects, features and advantages of the present invention will become more readily apparent from the following description, reference being made to the accompanying drawing in which.

Figure 6:
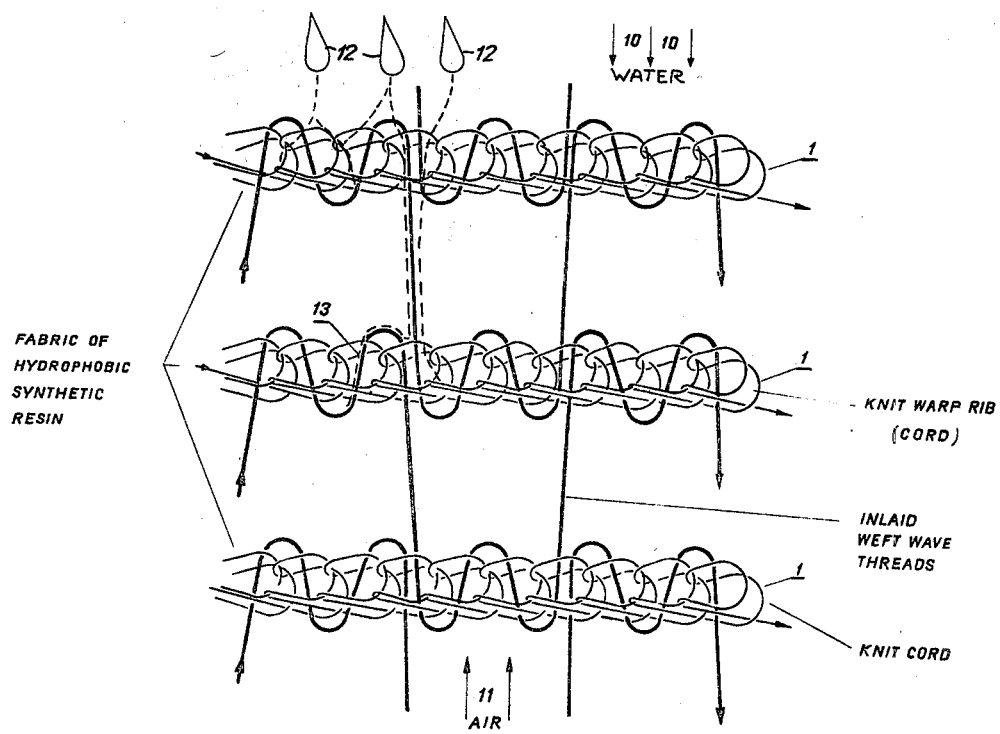
FIG. 6 is a detail view of the fabric, in somewhat diagrammatic form.

Referring first to FIG. 6, it can be seen that the fabric serving as the trickle plates of the present invention generally comprises a warp knit whose ribs 1 run horizontally and are parallel to one another so as to constitute a ladder for the water film cascading downwardly as represented by the arrows 10. The air stream is directed upwardly parallel to the plates or sheets as represented by the arrows 11. Turbulence is promoted by the ribs or cords 1 which are linked by the weft threads laid-in between the loops of the wales. The inlaid weft threads are shown at 2.

Consequently, a water droplet may follow a path as represented by arrows 12 along vertically running cords of the weft threads to the ribs 1 where these droplets may be retarded (arrows 13) until the droplets accumulate and flow as a film over these ribs onto the next-lower rib of loop wales. As a result, a thoroughly mixing of the various water streamlets, forming the film of water, is assured. The fabric is entirely knitted with interlooped threads as indicated, and is composed of a nonbibulous hydrophobic synthetic fiber such as nylon.

Figure 1:
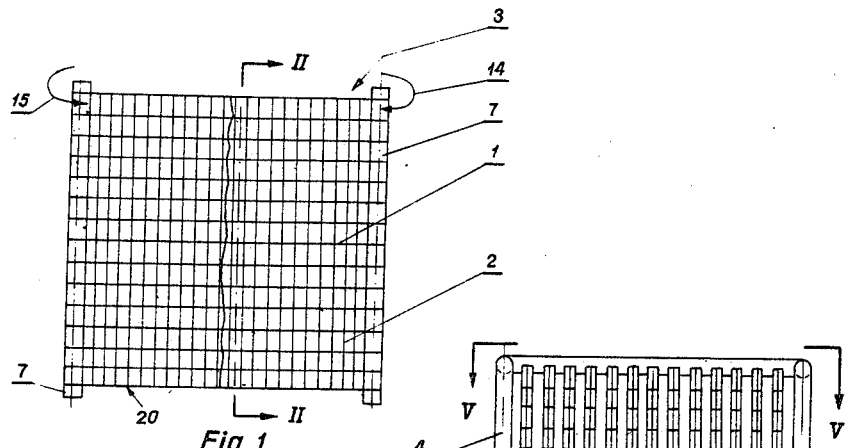
FIG. 1 is an elevational view diagrammatically showing one vertically oriented stage of a cooler of the present invention.
Figure 2:
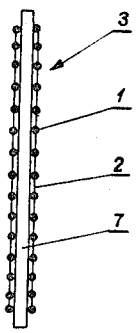
FIG. 2 is a cross-sectional view along the line II—II of FIG. 1.
Figure 4:
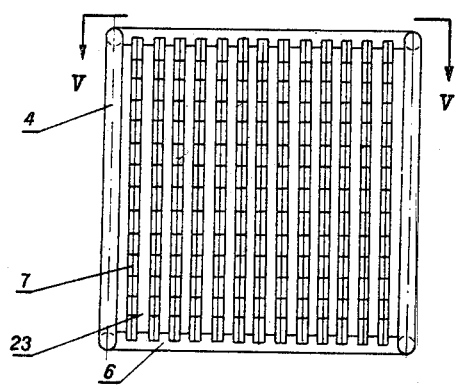
FIG. 4 is a view in the direction of line IV—IV of FIG. 3.

Each of the trickle stages of the device of the present invention comprises, as shown for the stage 3 in FIGS. 1 and 2, a pair of transversely spaced vertically extending parallel tubes 7 composed of a synthetic resin about which the fabric 20 (FIG. 6) is wound as represented by the arrows 14 and 15, thereby imparting a zigzag configuration to the plates. The thickness of the knitted fabric is 0.2 to 2 mm. The tubes 7 are disposed in parallel arrays and are attached to respective horizontal support tubes 6 (FIGS. 3–5) forming four horizontal members of the cubic frame and having cutouts 6' receiving the tubes 7 which are thermally welded to each other.

Figure 5:
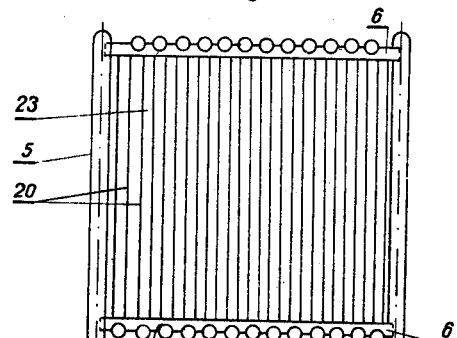
FIG. 5 is a view taken along the line V—V of FIG. 4.

The horizontal tubes 6 are anchored, also by thermal welding, in the horizontal tubes 5 of the lateral frames which are completed by the vertical risers 4. As represented in FIG. 5, the stages 20 are formed by a continuous knit fabric sheet wound in zigzag fashion about the tubes 7, alternately from one array to the other.

Figure 7:
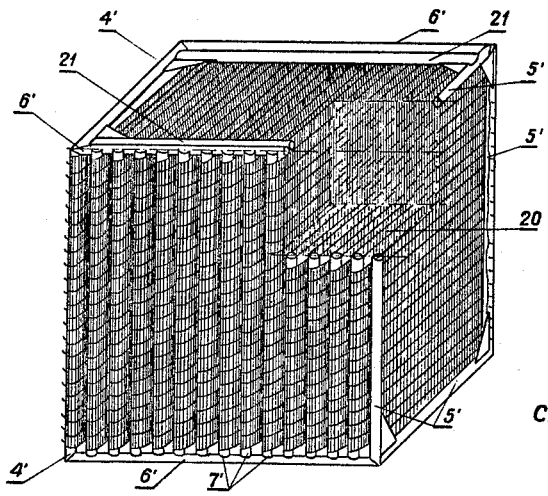
FIG. 7 shows another trickle unit embodying the invention in perspective.

A rectangular prismatic configuration is shown in FIG. 7, in which the zigzag fabric forming the sheets 20 is wound about plastic tubes 7' forming parallel arrays and disposed between the horizontal bars 6' supporting the tubes 7'. The frame members 4' and 5' at the opposite ends of the device complete, with the members 6', the frame structure. A crossbar 21 is provided to reinforce the frame at the edges thereof.

Figure 3:
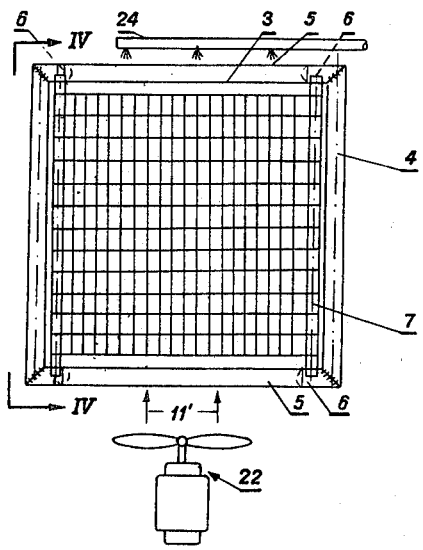
FIG. 3 is an elevational view of the trickle unit illustrating the frame supporting the fabric plates.

The operation of the device will be apparent from FIGS. 3 and 6. In the former, we show a blower arrangement 22 for forcing a stream of cooling air upwardly (arrows 11') through the vertical compartments 23 between the fabric sheets parallel to the plane of the fabric and to the film of water flowing downwardly from a spray head 24. The water thus flows in the direction of arrows 10, 12 and 13 cooling air and transferring heat to the latter. Any conventional collecting trough can be provided below the trickle unit.

We claim:

1. An apparatus for cooling recirculated water in an industrial plant, comprising a trickle stack having a plurality of generally parallel stages, means for depositing a film of said water on said stages for cooling the water passing therealong by evaporation and heat transfer to air passing between said stages, said stages each comprising a pair of tubular supports and webs of openwork warp-knitted fabric spanning said supports and composed of synthetic-resin filament, said fabric being formed with a plurality of transversely spaced ribs linked by the weft threads while defining an openwork therebetween.

2. The apparatus defined in claim 1, further comprising means for directing a stream of air between said stages parallel to the descending film of water.

3. The apparatus defined in claim 1 wherein said stack comprises a tubular prismatic frame and a spaced-apart array of vertically extending, mutually parallel, horizontally spaced tubes constituting said supports, said fabric being wound in zigzag fashion around the tubes of said arrays alternately to form upright stages in spaced relationship with said ribs extending generally horizontally.

4. The apparatus defined in claim 3 wherein said frame is generally cubical.

5. The apparatus defined in claim 4 wherein said frame and said tubes are composed of a synthetic resin.

6. The apparatus defined in claim 4 wherein said fabric is composed of a hydrophobic filament.

7. The apparatus defined in claim 6 wherein said fabric has a thickness between substantially 0.2 and 2 mm.

References Cited

UNITED STATES PATENTS

| | | | |
|---|---|---|---|
| 2,615,699 | 10/1952 | Dixon | 261—94 |
| 3,243,170 | 3/1966 | Ellis et al. | 261—94 |
| 3,318,586 | 5/1967 | Meredith | 261—102 X |

FOREIGN PATENTS

| | | |
|---|---|---|
| 324,938 | 2/1930 | Great Britain. |
| 759,887 | 10/1956 | Great Britain. |

TIM R. MILES, Primary Examiner